United States Patent Office 3,226,079
Patented Dec. 28, 1965

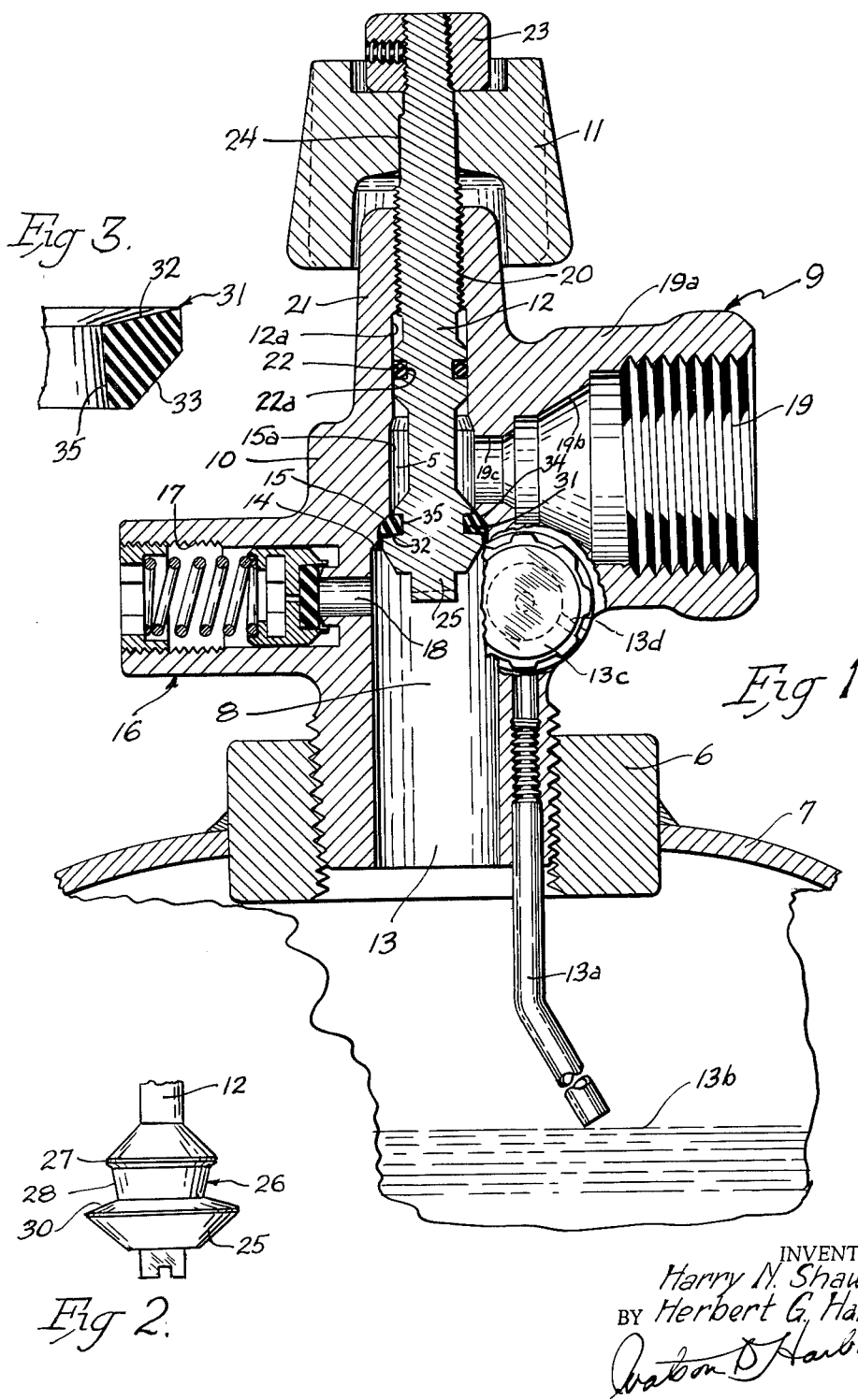

3,226,079
SWIVEL RING VALVE
Harry N. Shaw, Lake Forest, and Herbert G. Hanson, Arlington Heights, Ill., assignors to The Bastian-Blessing Company, Chicago, Ill., a corporation of Illinois
Filed Apr. 3, 1963, Ser. No. 270,298
2 Claims. (Cl. 251—218)

This application is a continuation-in-part of our co-pending application, Serial No. 41,332, filed July 7, 1960, now Patent No. 3,145,733, reference and incorporation of which is hereby made.

This invention relates to control or shut-off valves, and more specifically to a valve having a plastic swivel ring for sealing off a fluid under pressure between a movable valve member and a valve seat.

O-rings and metal-to-metal sealing members have been used heretofore but they involve wear and expensive mating contours, respectively, which became damaged with solid particles and leaked.

In this connection another frequent cause of leakage in prior valves utilizing a resilient deformable sealing member is the embedding of foreign particles or contamination of the fluid into the sealing member. Also since the resilient or deformable sealing members of these valves are held in fixed relationship with the movable valve member, the embedded foreign particle will form a groove or scratch the metal surface of the cooperating seat portion of the valve as the valve is continually operated. As is readily understood, this grooved or scratched surface will eventually allow the fluid under pressure to leak past the sealing member.

It is also quite common in valves of the prior art to require a skilled person to replace the sealing members. The resilient sealing members are of such design that in many instances special tools and care are required to properly assemble the valve.

Heretofore, it has been necessary to use special or individual sealing means for each type of fluid being handled. Today, throughout industrial plants, it is necessary to have valving for all types of conditions and for handling all types of materials. It is quite obvious that it is necessary to provide valves and systems which will have an increased longevity and which are capable of being used in several different types of installations as where different metals may be used for different fluids.

It is therefore, among the objects of this invention to provide an improved and useful sealing member for a control valve which requires no servicing and in handling high pressures need not and cannot be removed from the valve body for repair or replacement; which is swivelly retained on a rotatable valve stem so that it may close and open with a rectilinear movement within a control valve body and this movement can be accomplished against the flow of fluid as well as in the same direction. Thus the valve closing with the flow serves also as a manually closed check valve against loosening as well as a manual shut-off valve.

Other objects of this invention are to provide an improved flexible plastic sealing member that is free to swivel directly upon and with respect to a rotatable valve stem when the valve is in either an open or closed position and with which the valve is easily assembled with a minimum of parts, without a gland nut, and without close radial and axial tolerances and movement involved with the movement of the stem in the valve body; which can be readily assembled over the valve stem and snapped into a correct and self-adjusting position so that both the seat and the sealing member or ring are not subject to wear due to rubbing at the point of contact; and, which freely swivels about a valve stem member so that a different sealing surface is generally presented each time to the mating sealing surface of the valve seat and to the valve stem when the valve is brought to a closed position.

Still further objects of this invention are to provide a valve having an improved plastic sealing member which is forced into a sealing orientation with a valve seat member by the combined action of a rotatable valve stem and the fluid pressure which is to be sealed and when opened the inlet to the valve is large, tapered and smooth to permit a rapid flow of very low turbulence with a venturi effect that lowers the pressure effective on a safety pressure relief valve during flow between the cooperating valve closure elements.

A further object of this invention is to provide an improved swivel ring valve having a contoured groove formed on a movable stem for retaining a swivel sealing ring whereby the contour of the groove is such to prevent flow of the seal if excessive thrust is applied to the stem to place the valve in a closed position.

Another object of this invention is to provide a valve having an improved plastic sealing member which is durable in structure, easily assembled in a valve, economically produced, and gives a snug tightening feeling to those using the valve by hand.

FIG. 1 is a cross-sectional view of the valve embodying this invention;

FIG. 2 is a fragmentary view of the seal retaining groove of this invention; and FIG. 3 is a cross-sectional view of the sealing member of this invention.

Referring to the drawings, a valve 9, illustrated in FIG. 1, includes a body or housing 10 with a passageway 8 therethrough, a handle 11, and a movable stem member 12 operated by the handle. The housing 10 may be of any suitable material, depending largely upon the fluid the valve will be used with and can be suitably formed by forging, casting and machining.

Referring now specifically to FIG. 1, the housing 10 of the valve 9 provides an externally threaded inlet port 13 which may be suitably threaded into the outlet collar 6 at the top of a liquefied gas container 7. The inlet port 13 connects to a venturi passageway 14, defined in part by the valve head, which tapers to a valve seat 15 beyond which it becomes a valve chamber 5 as will be explained later. The inlet port 13 to the valve is large and smooth to permit a rapid flow of the fluid, the design being such that there are no protruding shoulders or abrupt constrictions to increase the turbulence of the fluid.

A spring-actuated relief valve 16 is mounted in an internally threaded aperture 17 which is an integral part of the housing 10. An inlet passage 18 to the relief valve 16 is connected to the inlet port 13 of the valve 9 at a point on the venturi throat 14 just below the valve seat 15. The structure of the relief valve 16 and its adjustment may be of any suitable relief means and per se is not a part of this invention. Also a standard fixed level gauge 13a extends to the fill level 13b in the tank 7 as controlled by valve 13c with outlet at 13d.

A discharge port 19 leads from the valve chamber 5 and preferably is positioned at right angles to the inlet port 13. It is formed by an internally threaded aperture in an integral boss 19a of the housing 10. The discharge port 19, as it extends inwardly of the housing 10, tapers in diameter as at 19b and terminates in a small diameter port 19c adjacent to the valve seat 15 in form to provide a conventional gas outlet connection.

The valve stem member 12 is mounted in the housing 10 at a point diametrically opposite the inlet port or passage 13 and at right angles to the discharge port 19 by being threaded as at 20 through an internally threaded boss 21 integral with the housing 10. A pressure sealing O-ring 22 is positioned in a groove 22a on stem 12 below the threaded engagement 20 to provide a pressure seal between the valve stem 12 and a cylindrical surface 12a in the housing.

The handle member 11 is removably secured to the upper portion of the valve stem 12 by a lock nut 23 to engage a squared portion 24 in rotary drive relationship.

Referring now more specifically to FIG. 1, the valve stem 12 passes downwardly through the bonnet boss 21 and the venturi throat 14 and terminates within the inlet passage 13. The lower end of the valve stem 12 has an annular groove 26. Immediately below the groove 26 the stem 12 ends in a conical shaped head portion 25. This conical shaped portion of the stem 12 has a threefold purpose. First, it acts as an efficient deflector in directing the passing of the fluid when the valve is open; second, it acts as a guide when the valve is being closed; and third, it provides an efficient locating and retaining means for receiving thereover a plastic sealing member 31, during assembly of the valve.

Referring now more specifically to FIG. 2, the annular retaining groove 26 is machined in the periphery of stem 12 at a point just above the venturi throat 14 and at the level corresponding to the valve seat 15. When the stem is in the extreme upper or closed position, a side wall 28 of the retaining groove 26 is tapered downwardly to a substantially flat wall 30 and is provided at its upper edge with a radial flange-like structure forming a cylindrical upper lip 27 between the conical shaped portion 25 and groove 26. Although the lower wall 30 may be flat, it is preferably cut at a slight taper as shown.

As seen from the description above and from the illustration in FIG. 2, the side walls of the groove 26 are frustro-conical with their axis coinciding with valve stem 12. The advantage of placing the retaining groove 26 in this angular position provides for an improved sealing relationship which will be described later.

Referring now specifically to FIG. 3, the sealing ring or member 31 is substantially quinquelateral in cross section and provides two sealing surfaces 32 and 33 disposed at an acute angle with respect to each other. The sealing member 31, in the preferred embodiment of this invention, is made from a resilient plastic material with the faces of the sealing surfaces 32 and 33 either slightly concave or convex to provide an effective seal. The lower sealing surface 32 of the sealing member engages the lower wall 30 of the groove 26 when the valve stem 12 is moved to the closed position. Likewise, the sealing surface 33 of the sealing member engages a mating surface 34 of the valve seat 15. The sealing member 31, formed from a suitable plastic material such as an acetal resin known as Delvin, a polyamide known as nylon, fluorocarbons known as Teflon or Kel-F, polycarbonate known as Lexan, vinyl-idenechloride polymers, known as Saran, to name a few, is resilient enough to slide, one portion first, over the retaining lip 27, into groove 26, and immediately return to its normal shape. As is readily seen from the figures, the sealing member 31 is so contoured generally as to fit the essential angular contours of the groove 26.

Still referring to FIG. 1, the valve stem surface 12, immediately above the groove 26, has a reduced diameter for maintaining a spaced relationship with a valve chamber wall 15a above the valve seat 15 when the valve is in the open position. Likewise, the outside diameter of lip 27 is reduced to be somewhat guided by the surface 15a when the valve is closed. For example, the diameters of the mating parts are machined so that the maximum tolerance build-up or clearance will be .001 of an inch between the surfaces 15a and 27 when the valve is in the extreme closed position. The controlled spaced relationship of these mating surfaces in conjunction with the annular groove 26 retains the swivel sealing member 31 and will not permit deformation or flow of the sealing member between these surfaces regardless of the axial force applied to the sealing member. It being understood that the volume of the sealing member 31 is subtsantially greater than that of the groove 26.

The sealing member 31 is moved into contact with the lower side wall 30 of the groove 26 and the surface 34 of the valve seat 15 by turning the handle 11 so that the valve stem moves upwardly. Seen in FIG. 1, the high pressure of the fluid at the inlet port of the valve provides a force which assists the closing and forces the sealing member upwardly and outwardly in conjunction with the force of the valve stem 12 as it moves in an upward direction to assure positive engagement of the two sealing surfaces with their corresponding mating surfaces.

A unique characteristic of the plastic materials used for the sealing member 31 is their ability to return to their molded form. This inherent ability to return to a molded form provides a method for assuring that the sealing member 31 will always be free to swivel on the valve stem 12 when the valve 9 is in the open or nearly open position. This feature of having the sealing member swiveling on the valve stem allows a presentation of a different portion of the sealing surfaces 32 and 33 to come into contact with their respective mating surfaces each time the valve is placed in a closed sealing position. This presentation of an entirely different surface each time the valve is closed will prevent the marring of the valve seat and the constant wearing of the sealing member in one area, thus increasing the life span of the valve.

It is also well known that a plastic material such as used in the sealing member 31 performs with metal as though it were lubricated and the frictional co-efficient between the sealing member 31 and a flat surface when engaged therewith will be very minute and will not act as a clamping action on the sealing member until the applied pressure is sufficient enough to overcome the reduced frictional co-efficient. This inherent structural advantage of the plastic material sealing member 31 combined with the proper dimensional tolerances of the groove 26 and the valve stem assures the swiveling action of the ring even though it is in partial contact with the mating sealing surface 34 of the valve seat 15.

Although resiliency and a low co-efficient of friction are desirable characteristics, a controlling feature for determining the type of plastic material to be used for the swivel ring seal is the fluid medium to be controlled by the valve. Therefore, since different plastic seal materials are to be used for different fluids, it is necessary to provide a suitable retaining groove and dimensional tolerances within the valve whereby the desired seal is attained regardless of the plastic material used without injury to the sealing member as an axial force is transmitted thereto by the valve stem when going to a closed position.

The smallest internal diameter of the seal must be capable of expansion to a sufficient diameter to slide over the lip 27, of the stem without exceeding the fracture point of the plastic ring. In situations where the desired plastic for the swivel ring will not expand sufficiently under pressure at room temperature to slide over the lip 27, preheating of the ring, such as placing it in hot liquid, will ordinarily permit sufficient expansion for installation on the stem without permanent injury to the plastic, which of course, will return to its normal condition upon cooling and further be forced to resume its molded form with the initial closings of the valve. Moreover, even though the form of this seal is reduced below its molded form by use, its recovery resiliency will assure the maintenance of its swivel characteristics on the valve stem.

In assembling the valve, it will be noticed that the bore from the inlet 13 through the thread 20 is progressively of reduced size so that the valve stem, after the ring 31 and O-ring 22 are slipped into place, can be inserted through the inlet 13 and threaded into closed position with a lefthand thread at 20. The handle is then mounted and fastened in place by the nut 23. Thereafter the valve is mounted on the cylinder 7 and the valve stem cannot be removed or tampered with.

When, however, the valve is open the head 25 moves down until it extends beyond the safety relief valve port 18 and in combination with the side walls of the bore provide a ring like venturi passage that stabilizes the operation of the safety valve against surge operation if heavy flows are turned off at an appliance with the valve 9 left open. Moreover, when closed the factors influencing the valve tend to prevent its inadvertent loosening since the pressure controlled endeavors to keep the valve closed.

Also it will be observed that since it is during filling operations that the valve seat ring is subjected to the most adverse flow conditions, the ring in the present invention is best supported to withstand such adverse conditions in that it rests against the wide shoulder 30.

It will be readily apparent to those skilled in the art that the present invention provides an improved and useful sealing means for control valves within the objects stated. The invention may be subject to numerous modifications well within the purview of the inventor, who only intends to be limited to a liberal interpretation of the specification and the appended claims.

What is claimed is:

1. A control valve comprising a housing having a fluid flow passage therethrough defining a surface of revolution defining a valve port with a tapering valve seat facing the inlet end of the passage, said passage including a large cylindrical inlet portion between said inlet end and said valve seat, a cylindrical outlet portion of a diameter the same as the outlet of said valve seat, and a terminal bore portion having a cylindrical sealing surface and a threaded portion, a valve stem extending through said valve port having a head portion within said large cylindrical inlet portion and a threaded portion rotatably engaging the first mentioned threaded portion for relative axial movement and a stem portion received within said sealing surface having an annular groove therein, a ring seal in said groove slidably engaging said sealing surface, said stem and ring seal being received into place in said passage solely through said inlet end, an outlet conduit means opening into said cylindrical outlet portion adjacent to said valve seat, a connecting passage in said housing having an opening into said large cylindrical inlet portion adjacent to said valve seat at a point opposite said valve stem head portion, said valve stem head portion having oppositely tapering surfaces on the inlet and outlet sides thereof defining therebetween one wall of an annular venturi throat in conjunction with said valve seat and said large cylindrical inlet portion, said outlet tapering surface having a circumferential groove with spaced side walls diverging radially outwardly with the side wall remote from the valve seat the widest being essentially normal to the axes of the valve stem, a sealing ring swively mounted in the groove, said sealing ring comprising a flexible, resilient plastic of low co-efficient of friction having an axial contoured sealing surface which rotatably mates with said widest wall of said groove in sealing relationship when closed and a tapering surface of revolution mating with the taper of the valve seat in non-rotating, leak-proof sealing relationship between the inlet and outlet ports under valve closing pressures, said valve head and sealing element being disposed within said valve seat taper to form therewith and with said large cylindrical inlet portion a venturi passage when said sealing element is away from said contact, said valve stem head portion extending beyond said connecting passage opening when the sealing element is fully open.

2. A control valve comprising a housing having a fluid flow passage therethrough defining a surface of revolution defining a valve port with a tapering valve seat facing the inlet end of the passage, said passage including a large cylindrical inlet portion between said inlet end and said valve seat, a cylindrical outlet portion of a diameter the same as the outlet of said valve seat, and a terminal bore portion having a cylindrical sealing surface and a threaded portion, a valve stem extending through said valve port having a head portion within said large cylindrical inlet portion and a threaded portion rotatably engaging said first mentioned threaded portion for relative axial movement and a stem portion received within said sealing surface having an annular groove therein, a ring seal in said groove slidably engaging said sealing surface, said stem and ring seal being received into place in said passage solely through said inlet end, an outlet conduit means opening into said cylindrical outlet portion adjacent to said valve seat, said valve stem head portion having oppositely tapering surfaces on the inlet and outlet sides thereof defining therebetween one wall of an annular venturi throat in conjunction with said valve seat and said large cylindrical inlet portion, said outlet tapering surface having a circumferential groove with spaced side walls diverging radially outwardly with the side wall remote from the valve seat the widest, a sealing ring swively mounted in the groove, said sealing ring comprising a flexible, resilient plastic of low co-efficient of friction having an axial contoured sealing surface which rotatably mates with the widest wall of said groove in sealing relationship and a tapering surface of revolution axially engaging the valve seat and side wall of the groove in non-rotating, leak-proof sealing relationship between the inlet and outlet ports under valve closing pressures, said valve head and sealing element being disposed within said valve seat taper to form therewith and with said large cylindrical inlet portion a venturi passage when said sealing element is away from said contact.

References Cited by the Examiner

UNITED STATES PATENTS

| 597,834 | 1/1898 | Shortle | 251—214 X |
| 1,291,401 | 1/1919 | Caven | 137—612.1 XR |
| 1,686,849 | 10/1928 | Frauenheim | 251—357 XR |
| 1,781,129 | 11/1930 | Sexauer | 251—357 |
| 2,646,246 | 7/1953 | Tucci | 251—357 |
| 2,704,650 | 3/1955 | Rand | 251—88 XR |
| 2,904,305 | 9/1959 | Novotny | 251—175 |
| 3,009,681 | 11/1961 | Carter et al. | 251—357 XR |
| 3,085,783 | 4/1963 | Pulling | 251—175 |

M. CARY NELSON, *Primary Examiner.*

LAVERNE D. GEIGER, *Examiner.*